(12) United States Patent
Fernández Gutiérrez

(10) Patent No.: US 11,989,752 B2
(45) Date of Patent: *May 21, 2024

(54) METHODS AND APPARATUS FOR TRANSMITTING MULTIMEDIA FILES IN A DATA NETWORK

(71) Applicant: Tamiras Per Pte. Ltd., LLC, Wilmington, DE (US)

(72) Inventor: Álvaro Fernández Gutiérrez, Barcelona (ES)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,107

(22) Filed: Feb. 13, 2023

(65) Prior Publication Data

US 2023/0230122 A1    Jul. 20, 2023

Related U.S. Application Data

(63) Continuation of application No. 17/399,906, filed on Aug. 11, 2021, now Pat. No. 11,593,834, which is a
(Continued)

(30) Foreign Application Priority Data

Apr. 27, 2009    (ES) ............... ES200930100

(51) Int. Cl.
*G06Q 30/02*    (2023.01)
*G06Q 30/0241*    (2023.01)
(Continued)

(52) U.S. Cl.
CPC ......... *G06Q 30/0241* (2013.01); *G06Q 30/02* (2013.01); *G06Q 30/0246* (2013.01);
(Continued)

(58) Field of Classification Search
CPC ............... G06Q 30/0241; G06Q 30/02; G06Q 30/0246; G06Q 30/0257; G06Q 30/0277; H04L 67/02; H04L 67/146; H04L 65/65
See application file for complete search history.

(56) References Cited

U.S. PATENT DOCUMENTS

| 4,866,769 A | 9/1989 | Karp |
| 4,916,747 A | 4/1990 | Arimoto |

(Continued)

FOREIGN PATENT DOCUMENTS

| EP | 1243998 A1 | 9/2002 |
| EP | 1641263 A2 | 3/2006 |

(Continued)

OTHER PUBLICATIONS

J. Brassil and H. Schulzrinne, "Structuring Internet media streams with cueing protocols," in IEEE/ACM Transactions on Networking, vol. 10, No. 4, pp. 466-476, Aug. 2002, doi: 10.1109/TNET.2002.801418. (Year: 2002).*

(Continued)

*Primary Examiner* — Sun M Li
(74) *Attorney, Agent, or Firm* — Fitch, Even, Tabin & Flannery LLP

(57) ABSTRACT

In one implementation a method of transmitting a multimedia file over a data network is provided that involves receiving from a device in a data network a first message in a first protocol that request first data associated with the multimedia file, the first data being useable by the device to establish a streaming session that involves a transmission of the multimedia file. The first message includes identifying data of a referring site. The method also involves transmitting to the device the first data and optionally the identifying data of the referring site and then receiving from the device a second message in a second protocol for the purpose of
(Continued)

creating a streaming session associated with the multimedia file. A streaming session is then created for transmitting the multimedia file to the device. In another implementation a method is provided that involves receiving in a computing device from a referring site an identifier of first data associated with a multimedia file and identifying data of the referring site, wherein the first data is useable for establishing a streaming session for downloading the multimedia file. The method further involves transmitting from the computing device a first message in a first protocol that requests the first data associated with the multimedia file and receiving in the computing device the first data. Upon receiving the first data the computing device transmits a second message in a second protocol for the purpose of creating the streaming session associated with the multimedia file, the second message including the first data and the identifying data of the referring site. The computing device then receives via the streaming session, all or a portion of the multimedia file. In some implementations, the first protocol and the second protocol are the same.

11 Claims, 8 Drawing Sheets

Related U.S. Application Data continuation of application No. 16/408,592, filed on May 10, 2019, now Pat. No. 11,093,965, which is a continuation of application No. 14/858,110, filed on Sep. 18, 2015, now Pat. No. 10,341,406, which is a continuation of application No. 12/767,684, filed on Apr. 26, 2010, now Pat. No. 9,154,532.

(51) Int. Cl.
*G06Q 30/0242* (2023.01)
*G06Q 30/0251* (2023.01)
*H04L 65/612* (2022.01)
*H04L 67/02* (2022.01)
*H04L 67/146* (2022.01)
*H04L 65/65* (2022.01)

(52) U.S. Cl.
CPC ..... *G06Q 30/0257* (2013.01); *G06Q 30/0277* (2013.01); *H04L 65/612* (2022.05); *H04L 67/02* (2013.01); *H04L 67/146* (2013.01); *H04L 65/65* (2022.05)

(56) References Cited

U.S. PATENT DOCUMENTS

| | | | |
|---|---|---|---|
| 4,953,209 A | 8/1990 | Ryder, Sr. |
| 5,247,575 A | 9/1993 | Sprague |
| 5,297,071 A | 3/1994 | Sugino |
| 5,629,980 A | 5/1997 | Stefik |
| 5,671,412 A | 9/1997 | Christiano |
| 5,708,709 A | 1/1998 | Rose |
| 5,790,664 A | 8/1998 | Coley |
| 5,815,665 A | 9/1998 | Teper |
| 5,855,008 A | 12/1998 | Goldhaber |
| 5,864,620 A | 1/1999 | Pettitt |
| 5,948,061 A | 9/1999 | Merriman |
| 6,009,525 A | 12/1999 | Horstmann |
| 6,073,124 A | 6/2000 | Krishnan |
| 6,078,909 A | 6/2000 | Knutson |
| 6,226,618 B1 | 5/2001 | Downs |
| 6,282,653 B1 | 8/2001 | Berstis |
| 6,324,658 B1 | 11/2001 | Jasperneite |
| 6,363,356 B1 | 3/2002 | Horstmann |
| 6,389,403 B1 | 5/2002 | Dorak, Jr. |
| 6,389,432 B1 | 5/2002 | Pothapragada |
| 6,434,535 B1 | 8/2002 | Kupka |
| 6,436,230 B1 | 8/2002 | Kondo |
| 6,452,903 B1 | 9/2002 | Peck |
| 6,505,169 B1 | 1/2003 | Bhagavath |
| 6,522,866 B1 | 2/2003 | Merkle |
| 6,535,871 B1 | 3/2003 | Romansky |
| 6,640,093 B1 | 10/2003 | Wildhagen |
| 6,654,754 B1 | 11/2003 | Knauft |
| 6,697,944 B1 | 2/2004 | Jones |
| 6,704,733 B2 | 3/2004 | Clark |
| 6,766,064 B1 | 7/2004 | Langan |
| 6,772,340 B1 | 8/2004 | Peinado |
| 6,775,655 B1 | 8/2004 | Peinado |
| 6,871,220 B1 | 3/2005 | Rajan |
| 6,947,981 B2 | 9/2005 | Lubbers |
| 6,981,217 B1 | 12/2005 | Knauft |
| 6,990,512 B1 | 1/2006 | Major |
| 6,996,544 B2 | 2/2006 | Sellars |
| 7,007,042 B2 | 2/2006 | Lubbers |
| 7,024,393 B1 | 4/2006 | Peinado |
| 7,036,011 B2 | 4/2006 | Grimes |
| 7,051,005 B1 | 5/2006 | Peinado |
| 7,054,443 B1 | 5/2006 | Jakubowski |
| 7,065,507 B2 | 6/2006 | Mohammed |
| 7,103,351 B2 | 9/2006 | Chaudhari |
| 7,103,574 B1 | 9/2006 | Peinado |
| 7,103,645 B2 | 9/2006 | Leighton |
| 7,110,982 B2 | 9/2006 | Feldman |
| 7,120,250 B2 | 10/2006 | Candelore |
| 7,120,429 B2 | 10/2006 | Minear |
| 7,124,301 B1 | 10/2006 | Uchida |
| 7,124,302 B2 | 10/2006 | Ginter |
| 7,149,722 B1 | 12/2006 | Abburi |
| 7,152,091 B2 | 12/2006 | Kuriyama |
| 7,155,415 B2 | 12/2006 | Russell |
| 7,171,662 B1 | 1/2007 | Misra |
| 7,188,342 B2 | 3/2007 | Demello |
| 7,200,575 B2 | 4/2007 | Hans |
| 7,203,758 B2 | 4/2007 | Cook |
| 7,249,060 B2 | 7/2007 | Ling |
| 7,277,870 B2 | 10/2007 | Mourad |
| 7,292,773 B2 | 11/2007 | Angel |
| 7,373,391 B2 | 5/2008 | Iinuma |
| 7,516,493 B2 | 4/2009 | Matsuyama |
| 7,565,429 B1 | 7/2009 | Fernandez |
| 7,574,486 B1 | 8/2009 | Cheng |
| 7,593,902 B2 | 9/2009 | Murase |
| 7,603,409 B2 | 10/2009 | Kobayashi |
| 7,636,792 B1 | 12/2009 | Ho |
| 7,640,333 B1 | 12/2009 | Fernandez Gutierrez |
| 7,707,115 B2 | 4/2010 | Goringe |
| 7,743,161 B2 | 6/2010 | Dey |
| 7,747,466 B2 | 6/2010 | Fernandez |
| 7,809,790 B2 | 10/2010 | Fernandez |
| 9,154,532 B2 | 10/2015 | Fernandez Gutierrez |
| 10,341,406 B2 | 7/2019 | Fernandez Gutierrez |
| 11,093,965 B2 | 8/2021 | Fernández Gutiérrez |
| 11,593,834 B2 | 2/2023 | Fernández Gutiérrez |
| 2001/0044851 A1 | 11/2001 | Rothman |
| 2002/0073084 A1 | 6/2002 | Kauffman |
| 2002/0091570 A1 | 7/2002 | Sakagawa |
| 2002/0091584 A1 | 7/2002 | Clark |
| 2002/0097728 A1 | 7/2002 | Hinderks |
| 2002/0107809 A1 | 8/2002 | Biddle |
| 2002/0116517 A1 | 8/2002 | Hudson |
| 2002/0133518 A1 | 9/2002 | Landsman |
| 2002/0138441 A1 | 9/2002 | Lopatic |
| 2002/0169833 A1 | 11/2002 | Tani |
| 2003/0007646 A1 | 1/2003 | Hurst |
| 2003/0046367 A1 | 3/2003 | Tanaka |
| 2003/0120557 A1 | 6/2003 | Evans |
| 2003/0149975 A1 | 8/2003 | Eldering |
| 2003/0185399 A1 | 10/2003 | Ishiguro |
| 2003/0188317 A1 | 10/2003 | Liew |
| 2003/0191801 A1 | 10/2003 | Sanjoy |
| 2003/0236756 A1 | 12/2003 | Humpleman |
| 2004/0003398 A1 | 1/2004 | Donian |
| 2004/0059708 A1 | 3/2004 | Dean |

(56) References Cited

U.S. PATENT DOCUMENTS

| | | |
|---|---|---|
| 2004/0088349 A1 | 5/2004 | Beck |
| 2004/0093327 A1 | 5/2004 | Anderson |
| 2004/0139204 A1 | 7/2004 | Ergezinger |
| 2004/0143667 A1 | 7/2004 | Jerome |
| 2004/0148229 A1 | 7/2004 | Maxwell |
| 2004/0205114 A1 | 10/2004 | Kinoshita |
| 2005/0004873 A1 | 1/2005 | Pou |
| 2005/0021467 A1 | 1/2005 | Franzdonk |
| 2005/0034171 A1 | 2/2005 | Benya |
| 2005/0076104 A1 | 4/2005 | Liskov |
| 2005/0114205 A1 | 5/2005 | Nelson |
| 2005/0144136 A1 | 6/2005 | Murashita |
| 2005/0251489 A1 | 11/2005 | Coley |
| 2005/0288999 A1 | 12/2005 | Lerner |
| 2005/0289630 A1* | 12/2005 | Andrews ............ H04N 21/6175 725/147 |
| 2006/0013557 A1 | 1/2006 | Poslinski |
| 2006/0031175 A1 | 2/2006 | Sellars |
| 2006/0031892 A1* | 2/2006 | Cohen .................. H04N 21/472 348/E7.071 |
| 2006/0059223 A1 | 3/2006 | Klemets |
| 2006/0095792 A1 | 5/2006 | Hurtado |
| 2006/0136967 A1 | 6/2006 | Hellman |
| 2006/0143135 A1 | 6/2006 | Tucker |
| 2006/0167812 A1 | 7/2006 | Bhambri |
| 2006/0218602 A1 | 9/2006 | Sherer |
| 2006/0251387 A1 | 11/2006 | Tanikawa |
| 2007/0011344 A1* | 1/2007 | Paka ....................... G06F 21/10 709/231 |
| 2007/0038567 A1 | 2/2007 | Allaire |
| 2007/0067495 A1 | 3/2007 | Levy |
| 2007/0083886 A1 | 4/2007 | Kauffman |
| 2007/0094691 A1 | 4/2007 | Gazdzinski |
| 2007/0118849 A1 | 5/2007 | Kisel |
| 2007/0140318 A1 | 6/2007 | Hellman |
| 2007/0162560 A1 | 7/2007 | Jin |
| 2007/0168294 A1 | 7/2007 | Tsurukawa |
| 2007/0244823 A1 | 10/2007 | Motley |
| 2007/0250636 A1* | 10/2007 | Stephens ............ H04N 21/6125 709/233 |
| 2007/0294772 A1 | 12/2007 | Hydrie |
| 2008/0022347 A1 | 1/2008 | Cohen |
| 2008/0027750 A1 | 1/2008 | Barkeloo |
| 2008/0069099 A1 | 3/2008 | Tani |
| 2008/0077478 A1 | 3/2008 | Kim |
| 2008/0086570 A1 | 4/2008 | Dey |
| 2008/0092168 A1 | 4/2008 | Logan |
| 2008/0092182 A1 | 4/2008 | Conant |
| 2008/0109306 A1 | 5/2008 | Maigret |
| 2008/0114695 A1 | 5/2008 | Gutierrez |
| 2008/0141307 A1 | 6/2008 | Whitehead |
| 2008/0195761 A1 | 8/2008 | Jabri |
| 2008/0201451 A1* | 8/2008 | Yu ........................ H04L 65/613 709/219 |
| 2008/0250029 A1* | 10/2008 | Fernandez ......... G06Q 30/0248 |
| 2008/0255943 A1 | 10/2008 | Morten |
| 2008/0288976 A1 | 11/2008 | Carson |
| 2009/0049004 A1 | 2/2009 | Nurminen |
| 2009/0083144 A1 | 3/2009 | Menditto |
| 2009/0132717 A1* | 5/2009 | Maes .................... H04L 65/104 709/228 |
| 2009/0204541 A1 | 8/2009 | Zhuk |
| 2009/0205031 A1 | 8/2009 | Sato |
| 2009/0240586 A1 | 9/2009 | Ramer |
| 2009/0240768 A1 | 9/2009 | Fernandez |
| 2009/0240786 A1 | 9/2009 | Fernandez |
| 2009/0240827 A1 | 9/2009 | Fernandez |
| 2009/0240828 A1 | 9/2009 | Fernandez |
| 2009/0240830 A1 | 9/2009 | Fernandez |
| 2009/0271525 A1 | 10/2009 | Jung |
| 2009/0286560 A1 | 11/2009 | Willis |
| 2009/0310609 A1 | 12/2009 | Gutierrez |
| 2010/0014519 A1 | 1/2010 | Gutierrez |
| 2010/0046516 A1 | 2/2010 | Fernandez |
| 2010/0054247 A1 | 3/2010 | Fernandez |
| 2010/0054248 A1 | 3/2010 | Fernandez |
| 2010/0054249 A1 | 3/2010 | Fernandez |
| 2010/0070355 A1 | 3/2010 | Fernandez |
| 2010/0076827 A1 | 3/2010 | Fernandez |
| 2010/0082835 A1 | 4/2010 | Fernandez |
| 2010/0153231 A1 | 6/2010 | Fernandez Gutierrez |
| 2010/0153873 A1 | 6/2010 | Gutierrez |
| 2010/0172351 A1 | 7/2010 | Gutierrez |
| 2010/0172352 A1 | 7/2010 | Gutierrez |
| 2010/0172353 A1 | 7/2010 | Gutierrez |
| 2010/0198982 A1 | 8/2010 | Fernandez |
| 2010/0228647 A1 | 9/2010 | Fernandez Gutierrez |
| 2010/0235237 A1 | 9/2010 | Fernandez |
| 2010/0235262 A1 | 9/2010 | Gutierrez |
| 2010/0235263 A1 | 9/2010 | Fernandez Gutierrez |
| 2010/0235264 A1 | 9/2010 | Fernandez Gutierrez |
| 2010/0235265 A1 | 9/2010 | Fernandez Gutierrez |
| 2010/0250400 A1 | 9/2010 | Fernandez Gutierrez |
| 2010/0257051 A1 | 10/2010 | Fernandez Gutierrez |
| 2010/0274664 A1 | 10/2010 | Fernandez Gutierrez |
| 2010/0299191 A1 | 11/2010 | Fernandez Gutierrez |
| 2011/0010459 A1* | 1/2011 | Stokking ............ H04L 67/1091 709/231 |
| 2011/0060688 A1 | 3/2011 | Fernandez Gutierrez |
| 2011/0060689 A1 | 3/2011 | Fernandez Gutierrez |
| 2011/0078044 A1 | 3/2011 | Fernandez Gutierrez |
| 2021/0374793 A1 | 12/2021 | Fernández Gutiérrez |

FOREIGN PATENT DOCUMENTS

| | | |
|---|---|---|
| JP | 2002175436 | 6/2002 |
| JP | 2003186905 | 7/2003 |
| JP | 2003256670 | 9/2003 |
| JP | 2003288130 | 10/2003 |
| KR | 20030075948 | 9/2003 |
| WO | 2006086717 A1 | 8/2006 |
| WO | 2006138432 A2 | 12/2006 |
| WO | 2008055562 A1 | 5/2008 |
| WO | 2008122308 A1 | 10/2008 |
| WO | 2009000306 A1 | 12/2008 |
| WO | 2009049659 A1 | 4/2009 |
| WO | 2009056175 A1 | 5/2009 |
| WO | 2009065526 A1 | 5/2009 |
| WO | 2009095041 A1 | 8/2009 |
| WO | 2009109684 A1 | 9/2009 |
| WO | 2009115631 A1 | 9/2009 |
| WO | 2010125052 A2 | 11/2010 |

OTHER PUBLICATIONS

M. Bolic, Z. Begic and E. Secerbegovic, "Streaming Media Transport Protocols on Basis of Next Generation Internet," 2008 IEEE International Symposium on Signal Processing and Information Technology, Sarajevo, Bosnia and Herzegovina, 2008, pp. 357-362, doi: 10.1109/ISSPIT.2008.4775645. (Year: 2008).*

"Introduction of Networking and Media Streaming", by Ketan Mayer-Patel, in Readings in Multimedia Computing and Networking, 2002, pp. 577-579, (Year: 2002) (Year: 2002).*

P. Zhang, J. Ma and X. Sun, "Intelligent delivery of interactive advertisement content," in Bell Labs Technical Journal, vol. 13, No. 3, pp. 143-158, Fall 2008, doi: 10.1002/bltj.20330. (Year: 2008).*

"Iomega: Iomega and Reciprocal announce strategic relationship to advance secure distribution of portable content; Partnership enables consumers to transfer and bind secure downloaded content to portable Zip disks and other Iomega products," M2 Presswire; Jun. 27, 2001; 3 pages.

Arnab, Alapan et al., "Verifiable Digital Object Identity System," published in DRM '06, Oct. 30, 2006, by the Association for Computing Machinery (ACM), in Alexandria, VA, USA; 7 pages.

Brassil, J. et al.; "Structuring Internet media streams with cueing protocols," in IEEE/ACM Transactions on Networking, vol. 10, No. 4, pp. 466-476, Aug. 2002, doi: 10.1109/TNET.2002.801418. (Year: 2002).

(56) References Cited

OTHER PUBLICATIONS

Delgado, Jaime et al.; "Standardisation of the management of Intellectual Property Rights in multimedia content," IEEE Proceedings of the Second International Conference on WEB Delivering of Music; Jan. 2002; 8 pages.

Duncan, Geoff; "Philips Wants to Patent Must-See Ads," Digital Trends; Apr. 19, 2006; from http://www.digitaltrends.com/home-theater/philips-wants-to-patent-must-see-ads/; 4 pages.

Gil, Rosa et al.; "Managing Intellectual Property Rights in the WWW: Patterns and Semantics," IEEE Proceedings of the First International Conference on Automated Production of Cross Media Content for Multi-Channel Distribution, 2005; 8 pages.

Hwang, Seong Oun et al.; "Modeling and implementation of digital rights," The Journal of Systems and Software 73 (2004) 533-549; 17 pages.

International Preliminary Report on Patentability and the Written Opinion of the International Searching Authority for International Application No. PCT/ES2008/009616, dated May 25, 2010; 7 pages.

International Preliminary Report on Patentability for International Application No. PCT/ES2009/070064, dated Jul. 14, 2009 (Spanish version); 13 pages.

International Preliminary Report on Patentability for International Application No. PCT/ES2009/070064, dated Oct. 20, 2010 (English translation); 10 pages.

International Search Report and the Written Opinion of the International Searching Authority for International Application No. PCT/EP2007/005049 dated Dec. 17, 2007; 13 pages.

International Search Report and the Written Opinion of the International Searching Authority for International Application No. PCT/EP2010/055608; dated Nov. 4, 2010; 16 pages.

International Search Report for International Application No. PCT/EP2007/008195 dated Dec. 28, 2007; 3 pages.

Jung, Sun-Mi et al.; "Implementation of the Agent Based Digital Rights Management System for Interaction on the Web," Abstract; published in Proceedings of the IASTED International Conference Internet and Multimedia Systems; conference article from conference held Aug. 13-16, 2008 in Honolulu, HI, USA; 1 page.

Krikke, J.; "Streaming video transforms the media industry," in IEEE Computer Graphics and Applications, vol. 24, No. 4, pp. 6-12, Jul.-Aug. 2004, doi: 10.1109/MCG.2004.17. (Year: 2004).

Liu, Qiong et al.; "Digital Rights Management from Content Distribution," Australian Information Security Workshop 2003 (AISW2003); Adelaide, Australia 2003; 10 pages.

Mayer-Patel, Ketan; Introduction of Networking and Media Streaming, in Readings in Multimedia Computing and Networking, 2002, pp. 577-579, (Year: 2002).

Paskin, N.; "The digital object identifier system: digital technology meets content management," Abstract; from Interlending and Document Supply, 1999, vol. 27, Issue 1, pp. 13-16; 1 page.

Radding, Alan; "Update reqs challenge software distribution tools," Software Magazine [Online], Sep. 1993; vol. 13, No. 14 (Special), pp. 31-41.

Williams, Louise Moore; "E-warehouse is secure ESD (electronic software distribution)," Tape-Disc Business [Online], Aug. 1997, vol. 11, No. 8, p. 31(5).

\* cited by examiner

```
C->S: DESCRIBE rtsp://server.streamingserver.com/file25 RTSP/2.0
      CSeq: 312
      User-Agent: PhonyClient 1.2
      Accept: application/sdp, application/example
```
⎫
⎬ 250
⎭

```
S->C: RTSP/2.0 200 OK
      CSeq: 312
      Date: Thu, 23 Jan 1997 15:35:06 GMT
      Server: PhonyServer 1.1
      Content-Base: rtsp://server.streamingserver.com/file24/
      Content-Type: application/sdp
      Content-Length: 358
```
⎫
⎬ 260
⎭

```
v=0
o=- 2890844526 2890842807 IN IP4 192.0.2.46  ——— 271
s=file 1
i=Affiliate web site = www.website5000.com
u=http://www.webserver.com/file1/file1.txt
e=streaming@example.com
c=IN IP4 100.110.120.130
a=recvonly
a=control:*
t=2873397496 2873404696
m=audio 3456 RTP/AVP 0
a=control:trackID=1
m=video 2232 RTP/AVP 31
a=control:trackID=2
```
⎫
⎬ 270
⎭

FIG. 2

```
v=0
o=- 2890844526 2890842807 IN IP4 192.0.2.46
s=file 1
u=http://www.webserver.com/file1/file1.txt
e=streaming@example.com
c=IN IP4 100.110.120.130
a=recvonly
a=control:rtsp://server.streamingserver.com/website5000/file24/   ⟵ 661
t=2873397496 2873404696
m=audio 3456 RTP/AVP 0
a=control:trackID=1
m=video 2232 RTP/AVP 31
a=control:trackID=2
```

FIG. 6

METHODS AND APPARATUS FOR TRANSMITTING MULTIMEDIA FILES IN A DATA NETWORK

CROSS-REFERENCE TO RELATED APPLICATIONS

This application is a continuation of U.S. patent application Ser. No. 17/399,906, filed Aug. 11, 2021, which is a continuation of U.S. patent application Ser. No. 16/408,592, filed May 10, 2019, issued as U.S. Pat. No. 11,093,965, on Aug. 17, 2021, which is application is a continuation of U.S. patent application Ser. No. 14/858,110, filed Sep. 18, 2015, issued as U.S. Pat. No. 10,341,406, on Jul. 2, 2019, which is a continuation of U.S. patent application Ser. No. 12/767,684, filed Apr. 26, 2010, issued as U.S. Pat. No. 9,154,532, on Oct. 6, 201, which claims priority to Spanish Patent Application No. P200930100, filed on Apr. 27, 2009, all of which are incorporated herein by reference in their entirety.

FIELD

The present invention relates to the online distribution of multimedia content.

BACKGROUND

The current trend in the market for playing audiovisual content embodying intellectual property rights, such as for example, movies or music, is oriented towards developing a series of DRM (Digital Rights Management) technologies, whereby users pay to view content without receiving advertising as part of the content. This principle is the basis for so-called VOD (Video on Demand), virtual stores that sell content over the Internet, and payment or PPP (Pay-Per-View) IP televisions where payment is made to see certain content.

The content producers and distributors that use this principle of payment for content have suffered seriously as a result of the development of P2P networks (Peer-to-Peer) which allow the exchange of content files free-of-charge, whereby the user viewing the content does not pay any fee. There are currently numerous P2P networks, such as for example, eMule, Ares Galaxy and Bittorrent, which have been very widely disseminated. P2P transmissions are systems that take advantage of the upload bandwidth available from each user who receives a file, for sharing the file. As a result, each user that receives data from a file may send the same data to other users. This leads to the creation of a network of users who exchange data that makes up a file, instead of each user downloading the complete file from a provider site.

The owners of the intellectual property rights of files distributed over P2P networks have filed numerous lawsuits in several countries for the purpose of closing down P2P networks. In an effort to avoid the servers managing the P2P networks being shut-down by police or other official or legal bodies, P2P networks have evolved in two ways: technologically and legally. From a technological perspective, "pure" P2P networks have appeared in which there are no servers that can be shut down by a court or police action. These new networks employ new technologies, such as for example, DHT (DHT Distributed Hash Tables) tables, which enable networks to operate without any server; hence there is no central point where the officials can stop the operation of the network. Stopping a pure P2P network requires freezing all its nodes or a large proportion of them. This greatly impedes the effectiveness of legal actions aimed at shutting down these networks. From a legal perspective, new P2P networks have appeared, such as Bit Torrent, where the servers do not contain any file with intellectual property rights but only contain "bit torrent" files containing information about the P2P network points from which parts of a file which are covered by intellectual property rights can be downloaded, and it is debatable whether supplying a single "bit torrent" file is illegal.

The debate as to the legality of P2P networks must, in addition, take into account the legal uses of these networks, such as for downloading files whose owners have consented to the downloading: software demonstration versions, open code software, content under the Creative Commons license and others. For these reasons, the current legal situation regarding P2P networks is not very clear and varies from country to country.

In contrast to the payment for content system, which, as explained has been seriously harmed by the recent appearance of P2P technologies, there is conventional television which broadcasts openly, and for which users do not have to pay to view content. Conventional television employs an advertising system whereby the television channel offers advertisers a reserved space in its broadcasts for inserting advertisements, and the cost of each advertisement is a function of its duration and the forecast audience at the time it is broadcast. In addition, projections about the type of audience, that is to say, the profile of the projected viewer, make it possible to adjust the type of advertisement for each channel and time slot. This same advertising system is currently used in cable-type digital television, with the difference that because a large number of thematic channels are available, it is possible to foresee a more precise typical viewer profile for each channel.

The extensive propagation of the Internet and the sudden surge of P2P networks have not significantly affected this conventional system of television advertising, which continues to function without experiencing the sustained income falls which are affecting the sales of music and films in CD and DVD formats. There appears to be a quite extensive and accepted social behavior of viewing commercial television channels that interleave advertising into their content to finance broadcasts, and this model has greater social acceptance by users than a pay for content system.

There is considerable interest in applying the principles of conventional television advertising to the area of Internet downloads, that is to say a user accesses audiovisual content in exchange for viewing an advertisement. As has been stated, this system has greater social acceptance than the pay-per-view system and makes it possible to adequately remunerate intellectual property right owners.

However, for a similar system to function satisfactorily for Internet downloads, technical solutions are required that allow, on the one hand, the widespread dissemination of audiovisual content provided via the Internet and, on the other, to enable an agile participation of the different participants: download sites, advertisers, users and owners of intellectual property rights. Both conditions are necessary for a system like this applied to Internet downloads to be sufficiently effective and to allow it to be implemented in practice.

Companies advertising products or services on the Internet try to ensure that their website can be found as easily as possible by a user surfing the network and who is interested in their products or services. A known method to reach this objective consists of advertising the products on content websites that attracts users interested in a specific theme.

These content websites can be, for example, thematic pages about video games, cinema, music, computer programs, etc. The advertisements are available as advertising insertions including a link, so that when the user clicks on one of the links he is redirected to the web page of the selling company that has placed the advertisement and the latter pays remuneration for the content web pages, as a function of the number of clicks made on the links.

U.S. Pat. No. 5,948,061 discloses an application of this method whereby advertisers deliver their advertisements to a server as advertising insertions for the latter to select which web pages are most appropriate for hosting each advertising insertion. The web pages that ascribe to this system contain a reference causing the browser of a user visiting said web page to contact the server, whereupon the latter sends an advertising insertion to the browser, for example as an advertising strip or "banner," so that the browser displays it on the user's computer screen. In selecting the advertising insertion that it sends to the browser, the server uses the information obtained from the user's browser, including identification of the web page that the user has visited, and information about the user (such as the Internet address from which he activates the browser and other data that the user has accessed to communicate). If the user clicks on the advertising insertion, the browser contacts the server again, and is redirected to the advertiser's web page by the server.

A more developed application of this method, which is more efficient with respect to the way in which the relationship between companies selling products or services, and the content web pages is organized, and also with respect to the technical implementation of the inclusion of advertising insertions into web pages and the remuneration according to the clicks made, is the Google "AdSense" system described in US patent applications published as US2004/0093327 and US2004/0059708. This system enables a web page to include advertising from several advertisers and to receive remuneration for it. The "AdSense" system analyses the content of the web pages that wants to host advertising insertions and decides which web pages are the most appropriate for each advertising insertion. The advertising insertions contain a link to the advertiser's web page. Each time a user clicks one of these advertising insertions, the web page owner hosting the advertising insertion receives remuneration from the advertiser. This AdSense system has a great advantage in that it enables companies to advertise on web pages whose content is related to its products and which will therefore be the most visited by users potentially interested in those products. Nevertheless, it has a drawback in that it does not effectively prevent fraudulent clicks produced when owners click on advertising insertions in their own web pages for the sole purpose of increasing the remuneration paid to them by the advertiser. Another form of fraudulent clicks consists of a company repeatedly clicking on the advertising insertion of another company for the sole purpose of quickly reaching the maximum budget fixed for that advertising insertion and causing its automatic deactivation. The fraudulent clicks problem seriously harms both the advertisers, who pay for useless clicks, and the owners of the web pages who host the advertising insertions. For this reason, some advertisers forego this system or are disposed to pay less for advertising insertions. Resolving this problem within the AdSense system would require detecting situations where a click is repeated several times from the same IP address and providing a procedure for deciding whether or not fraudulent clicks are involved. For reasons obvious to a person expert in this area, such a solution complicates the operation of the system. Another disadvantage of the AdSense system is that it does not respond to specific problems posed by the downloading of digital files with intellectual property rights.

U.S. Pat. No. 6,363,356 describes a system that offers a solution applicable to the distribution of software online with the option of trying before buying. This system permits the advertiser to only pay for clicks that have actually led to a software sale. To do this, when a user clicks an advertising insertion and is redirected to the web page of the software company, the URL (Uniform Resource Locator) address of the web page hosting the advertising insertion is included in the redirection. This information is received and stored by the server hosting the web page of the software company, and is added to the digital file, when the user downloads it. Thus, when the user re-contacts the web page of the software company to purchase a software user-license, it is possible to know which web page contained the advertising insertion resulting in the license purchase. This system has not received market acceptance because it exhibits various drawbacks. A first drawback consists of the fact that it is not designed for universal application: each advertising company must implement its own way of relating to several content web pages and including advertising insertions in them. A second disadvantage with this system is that, to add the URL address of the referenced web page to the downloaded file, the file is encapsulated by "wrapper" and the information is added to the latter. The user does not directly download the digital file selected, but rather the wrapper containing it. This necessitates a recompiling process prior to downloading and therefore a waiting time is introduced that is excessively long in comparison to accepted download times on the Internet. A third disadvantage of this system is that it does not contemplate the case where the downloading is direct, that is to say, from a content web page offering downloads, such as for example, the www.tucows.com web page.

As has been seen, the known technical solutions are not satisfactory. For this reason, current audiovisual content distribution systems only offer the option of paying to view content, with the result, as before explained, that many users opt to download the content from P2P networks, thus denying intellectual property right owners the ability to receive remuneration.

U.S. Pat. No. 7,152,091 discloses an advertising method applied to downloading content via the Internet consisting of displaying an advertisement on the user's browser while he is downloading the content. The download is cut-off if the user interrupts the display of advertising on his browser. This method has the drawback that it is not very effective in practice, in that users are not accustomed to staying in front of the computer during the time taken by the download. With the technology currently available for the majority of users, the downloading of a 400 Mbyte video takes approximately four hours, in which case the user normally initiates a download and goes away to do other things. In addition, the method described in U.S. Pat. No. 7,152,091 does not make it possible to check that the user is actually viewing the advertisements. Even assuming that the user remains in front of the computer, he can minimize the browser window where the advertisements are displayed and continue performing other tasks on the computer.

SUMMARY

One purpose of the present invention is to provide an improved system for the online distribution of audiovisual content with advertising.

In one exemplary embodiment, a method is provided whereby a first server transmits a multimedia file over a data network by means of a streaming protocol. In one implementation, the first server or a second server receives from a device connected to the data network a first message in a first protocol requesting information useable for downloading the content of the multimedia file by means of a streaming protocol, and the first message includes some identifying data associated with a referring website. In one implementation the information useable for downloading the content of the multimedia file is data residing in a file, hereinafter referred to as a "Description File". It is to be appreciated that the term "Description File" is in no way limiting and includes any form of data accessible in or to the first and/or second servers and transferable to the device. As such, the term "Description File" may comprise a single file, multiple files, or any other means by which the data is made accessible to the device. In one implementation the Description File is an RTSP Description File. In one implementation the first and/or second server adds the identifying data to the Description File and transmits the data useable for downloading the content of the multimedia file together with the identifying data associated with the referring website to the device. In return, the first server receives from the device a second message in a second protocol for creating a streaming session for transmission of the content of the multimedia file with the second message containing the identifying data from the referring website. In one implementation the server then creates a streaming session for transmitting the content of the multimedia file to the device and assigns a session identifier for the streaming session created with the session identifier comprising an association with the identifying data of the referring site. In one implementation the first protocol and the second protocol are the same.

In one implementation the multimedia file 24 comprises content and advertisements. In one implementation the first server transmits multimedia content only after transmitting all the advertisements.

In one implementation the first server tracks the advertisements transmitted to the device during the streaming session and maintains data for the purpose of remunerating the referring website in accordance with the advertisements transmitted.

In one implementation the first protocol is the Hypertext Transfer Protocol (HTTP) protocol.

In another implementation, the first protocol is the Real Time Streaming Protocol (RTSP).

In another implementation, the second protocol is the Real Time Streaming Protocol (RTSP).

In one implementation a method of transmitting a multimedia file over a data network is provided that comprises receiving from a device in a data network a first message in a first protocol that request first data associated with the multimedia file useable by the device to establish a streaming session that involves a transmission of the multimedia file, the message comprising identifying data of a referring site, transmitting to the device the first data, receiving from the device a second message in a second protocol for the purpose of creating a streaming session associated with the multimedia file, creating a streaming session for transmitting the multimedia file with one or more advertisements to the device and associating the streaming session with the identifying data of the referring site, and tracking the advertisements transmitted to the device and maintaining data useful for remunerating the referring site for the advertisements transmitted to the device and/or the advertisements played in the device.

In one implementation a method of transmitting a multimedia file over a data network is provided that comprises receiving from a device in a data network a first message in a first protocol that request first data associated with the multimedia file useable by the device to establish a streaming session that involves a transmission of the multimedia file, the message comprising identifying data of a referring site, transmitting to the device the first data and the identifying data of the referring site, receiving from the device a second message in a second protocol for the purpose of creating a streaming session associated with the multimedia file, and creating a streaming session for transmitting the multimedia file to the device and associating the streaming session with the identifying data of the referring site.

In another implementation a method is provided that comprises receiving in a computing device from a referring site an identifier of first data associated with a multimedia file and identifying data of the referring site, the first data useable for establishing a streaming session, transmitting from the computing device a first message in a first protocol that request the first data associated with the multimedia file, receiving in the computing device the first data, transmitting from the computing device a second message in a second protocol for the purpose of creating the streaming session associated with the multimedia file, the second message comprising the first data and the identifying data of the referring site, and receiving in the computing device, via the streaming session, all or a portion of the multimedia file.

In one implementation a method is provided wherein multimedia file comprises content and one or more advertisements, and the computing device transmits information to the referring site after having received an advertisement and/or upon having played a portion or all of an advertisement associated with a streaming session.

BRIEF DESCRIPTION OF THE DRAWINGS

Other advantages and characteristics can be seen from the following description, which includes, without any limitations, some exemplary embodiments of the present invention, reference made to the accompanying drawings in which:

FIG. 2 shows an example of an exchange of RTSP DESCRIBE and "200 OK" type messages for transmitting data using the RTSP and SDP protocols.

FIG. 6 shows an example of a "Description File" including identifying data inserted into an RTSP URI using a field of the SDP protocol.

DETAILED DESCRIPTION

Figure 1:
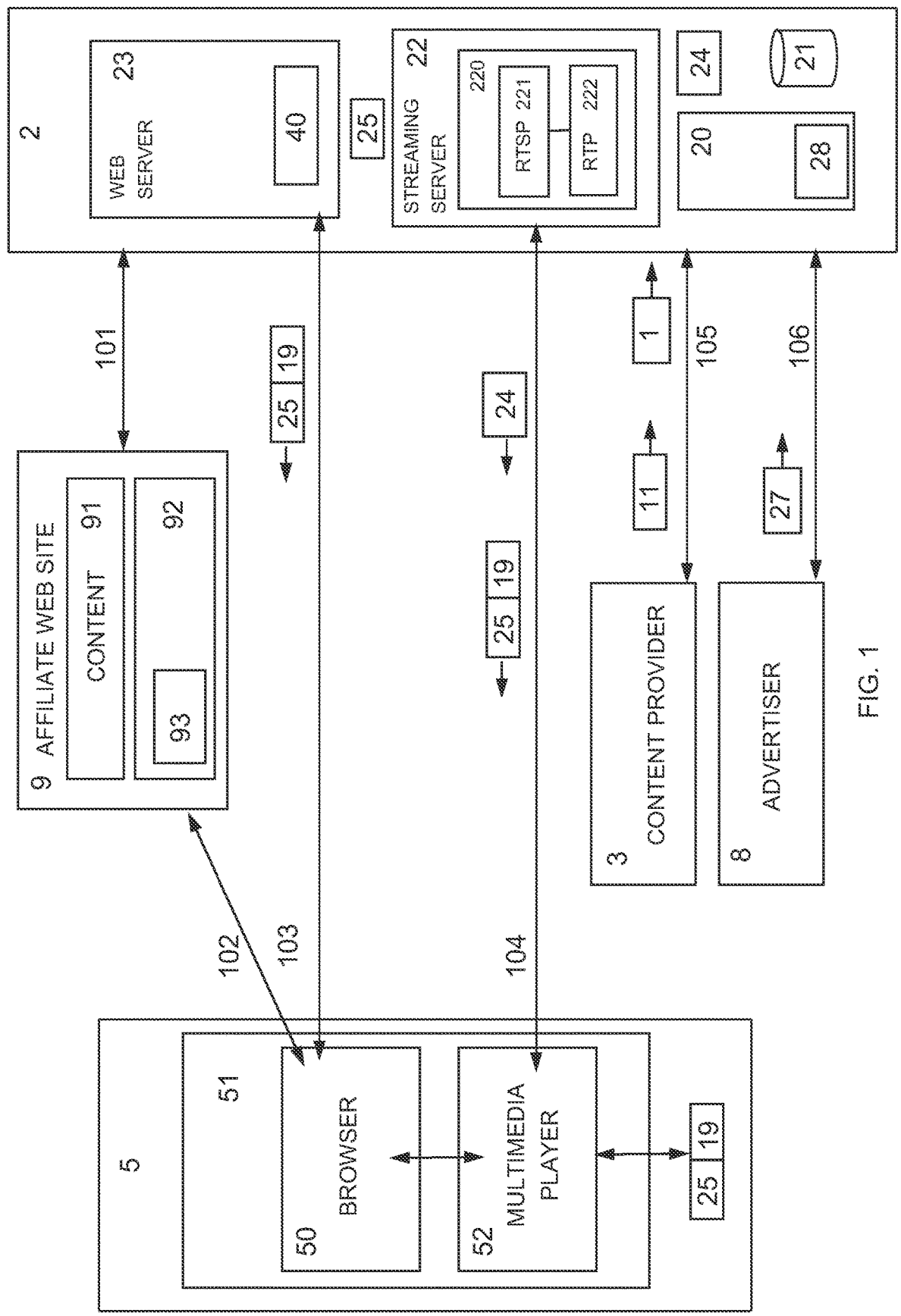
FIG. 1 shows a block diagram of an exemplary system for implementing the present invention.

The block diagram of FIG. 1 schematically illustrates an implementation of the present invention in a data network. In the example of FIG. 1, computer 5 displays on browser 50, link 93 for affiliated website 9 and when the link 93 is activated in browser 50, computer 5 downloads from an intermediary site 2 data 25 useable by the computer 5 for downloading the content of the multimedia file 24 by means of a streaming protocol. Throughout the description that follows, the data 25 useable by the computer 5 for downloading the content of the multimedia file by means of a streaming protocol is described as residing in a "Description File". It is to be appreciated that the term "Description File" is in no way limiting and includes any form of data accessible in or to the first and/or second servers and transferable to the device. As such, the term "Description File" may comprise a single file, multiple files, or any other means by which the data 25 is made accessible to the computer 5. In one implementation the Description File 25 is an RTSP Description File. Moreover, with respect to many of the implementations disclosed herein, the term "Description File" is used to refer to data comprising an aggregate of the data 25 and identifying data of the website 9, commonly referred to as the referring site 9. In one implementation the Description File 25 is used by multimedia player 52 to establish a communication 104 with streaming server 22 and to download, by means of a streaming protocol, a multimedia file 24 having advertisements and multimedia content.

The present invention may be implemented using different streaming protocols, such as for example, the Adobe Flash, Microsoft Silverlight, Real Time Streaming Protocol (RTSP), etc. The RTSP is briefly explained below and will be used as an example throughout the remainder of the disclosure.

The RTSP is described in the RFC 2326 specifications published online by IETF (H. Schulzrine et al., Internet Engineering Task Force, Network Working Group, Request for Comments 2326, April 1998; currently available at the following website address HTTP://www.ietf.org/rfc/rfc2326.txt). The operation of the RTSP is closely related to two other IETF (Internet Engineering Task Force) protocols: the SDP and RTP protocols. The SDP ("Session Description Protocol") protocol is described in RFC 4566 specifications published online by the IETF. (M. Handley et al., Request For Comments 4566, Network Working Group, July 2006, currently available at the following website address HTTP://www.ietf.org/rfc/rfc4566.txt). The RTP ("Real-time Transport Protocol") is described in RFC 3550 specifications published online by the IETF (H. Schultzrinne et al., Request For Comment 3550, Network Working Group, July 2003, currently available at the following website address HTTP://www.ietf.org/rfc/rfc3550.txt).

A new draft of the RTSP protocol entitled RTSP 2.0 is currently available. It is described in the document published online by the IETF "Real Time Streaming Protocol 2.0 (RTSP) draft-ietf-mmusic-rfc2326bis-20.txt", H. Schulzrinne et al., MMUSIC Working Group, March 2009, currently available at the following website address HTTP://www.ietf.org/internet-drafts/draft-ietf-mmusic-rfc2326bis-20.txt). Another protocol related to RTSP is the HTTP ("Hypertext Transfer Protocol") described in the RFC 2616 specifications published online by the IETF (R. Fielding et al., Request For Comments 2616, Network Working Group, June 1999, currently available at the following website address HTTP://www.w3.org/Protocols/rfc2616/rfc2616.html.

The RTSP is a client-server protocol based on text messages, designed to facilitate communication between a client and a streaming server, so that the client controls the streaming transmission from the server using the RTSP as though it were remotely controlling the server. The client can be any device that can play a multimedia stream, such as for example, a PDA, a mobile phone and in general any device incorporating an audio or video player. The RTSP makes it possible to establish and control one or several data "streams" or flows from a streaming server to the multimedia player. The term "stream", will be used to refer to each of these data flows.

The RTSP is a protocol that uses the multimedia player for communicating to the streaming server by means of RTSP messages, the multimedia content that it wants to receive. The streaming server also sends RTSP messages to the multimedia player containing information about the selected content and the manner in which it will be transmitted to the multimedia player.

The RTSP uses the term "presentation" to refer to a collection of streams that are jointly presented to the client and that are defined in a presentation file called the "Presentation Description File" or simply the "Description File." Other protocols use different names to refer to a presentation. For example the SDP protocol uses the term "session" to refer to a presentation. Henceforth the term "streaming session" will be used to refer to a presentation, that is to say, a set of streams that are jointly presented to the client, or to a single stream.

An RTSP Description File contains information about each stream included, for example, information as to whether it is an audio or video stream, the type of coding used, Internet addresses necessary for accessing each stream, etc. An RTSP Description File can employ various formats for describing this information. The SDP protocol is most often used, although it is not necessary to use it, and the RTSP can describe the information using other protocols distinct from SDP. A presentation file is normally identified by means of a URI ("Uniform Resource Identifier"). For example, the following URI could be used to identify a presentation file.

rtsp://media.example.com:554/twister

A client can access the presentation file using the RTSP or different protocols, such as for example, the HTTP. The client can also receive the information describing the presentation by electronic mail or by any other means.

RTSP uses the term "container file" to refer to a multimedia file containing the data from one or several streams and which normally constitute a presentation when they are reproduced jointly. For example, a container file can contain three streams: a first video stream of a film, a second audio stream of the film in English and a third stream containing the audio in the Spanish language.

RTSP uses the term RTSP session to define an abstraction, for example a software module being executed in the streaming server, that uses the streaming server to control each presentation or streaming session that it transmits to each user. Each RTSP session is created, maintained and deleted by the server. Normally a client requests creation of a session by sending an RTSP SETUP command to the server, and receives from the server an RTSP response, called a RESPONSE message containing an identifier for the session created.

RTSP sessions store information about the status of each presentation or streaming session requested by each user. This is an important difference with respect to the HTTP protocol, which is a protocol that does not maintain the status of the client's requests.

Another important difference is that with the RTSP, the server can send RTSP messages with commands to the client, as well as receiving them. The following Table 1, extracted from RFC 2326, indicates the different commands, messages or methods in RTSP terminology, which can currently be sent between the client and the server.

TABLE 1

| method | direction | object | requirement |
|---|---|---|---|
| DESCRIBE | C->S | P, S | recommended |
| ANNOUNCE | C->S, S->C | P, S | optional |
| GET_PARAMETER | C->S, S->C | P, S | optional |
| OPTIONS | C->S, | P, S | required (S->C: optional) |
| PAUSE | C->S | P, S | recommended |
| PLAY | C->S | P, S | required |
| RECORD | C->S | P, S | optional |
| REDIRECT | S->C | P, S | optional |
| SETUP | C->S | S | required |
| SET_PARAMETER | C->S, S->C | P, S | optional |
| TEARDOWN | C->S | P, S | required |

The RTSP server can send the data packets for each stream to the client using the RTP protocol, but RTSP does not depend on the RTP protocol and could employ other transport protocols.

Returning to the example in FIG. 1, the data network is, for example, the Internet. The system consists of one user's device 5, an intermediary site 2, multiple referring sites 9 associated with the intermediary site 2, multiple content owner sites 3 and multiple advertising sites 8, where all these sites 2, 3, 8 and 9 are nodes on the network (e.g., Internet). To better clarify this explanation, a sole referring site 9, a sole content owner site 3 and a sole advertising site 8 have been depicted. However, the system and the procedure according to the implementations are particularly advantageous when a large number of referring sites 9 take part, given that the greater the number of referring sites 9, the greater will be the number of Internet users attracted by these and therefore the greater the number of file downloads.

The various sites 2, 3, 8 and 9 and user's device 5 can establish between them the online communications illustrated in FIG. 1 as communications 101, 102, 103, 104, 105 and 106.

The communications between the various sites of FIG. 1 may be implemented using different communication technologies or protocols, such as FTP ("File Transfer Protocol"), HTTP ("Hypertext Transfer Protocol"), web services, SOAP ("Simple Object Access Protocol") objects, TCP/IP ("Transmission Control Protocol"/"Internet Protocol") connections or any other method of communication between networks.

In the example of FIG. 1, device 5 is a computer with an Internet connection. However, the invention is also applicable to other equipment that can be connected to a data network, such as, for example, mobile telephones, digital players, etc., which can be connected to a data network. Computer 5 has an operating system 51 on which a browser or a web browser 50 and a multimedia player 52 are installed.

In one implementation an advertising site 8 is a network node that communicates with the intermediary site by means of communication 106 to send it multimedia files 27 containing advertisements, so that intermediary site 2 may transmit them together with other multimedia content requested by the users.

In one implementation a content owner site 3 is a site belonging to a company, or a person, who owns the rights to some audiovisual content in some files 1 and who is interested in obtaining advertising income derived from playing the audiovisual contents of the files 1. In one implementation content owner site 3 is registered on-line 105 on the intermediary site 2. During a registration process 105, content owner site 3 may introduce its identifying data, such as for example, name, address, e-mail etc. and sends files 1 to intermediary site 2 so that it can distribute them. In one implementation intermediary site 2 has an intermediation application 20, for example, using a web interface, making the registration process possible and storing the registration information from content owner site 3 in a database 21.

In one implementation during the registration process, content owner site 3 also provides intermediary site 2 with commercial information 11 related to file 1. In one implementation this commercial information includes information about the type of content that will permit intermediary site 2 to select the advertising categories most appropriate to each type of content, such as for example, the file name, actors' names, type of film, etc. In one implementation it also includes a series of keywords associated with each file 1 indicating the content of the file that will be useful to intermediary site 2 for selecting some referring sites 9 appropriate for each file 1, as will be seen below. In one implementation intermediary site 2 stores this information 11 in database 21, and can modify it to adapt it to its own criteria, such as for example, to prevent advertising adult content on websites that are not classified as adult websites, or any other type of modifications that intermediary site 2 deems appropriate to provide in the file descriptions.

In one implementation intermediary site 2 establishes agreements with a series of affiliated sites or referring sites 9 interested in participating in the online distribution of files 1 in exchange for receiving a commission or percentage of the advertising income generated.

In one implementation the function of referring site 9 is to attract a specific group of users surfing the Internet who are interested in content 91 offered by referring site 9. Users who visit a web page of referring site 9 can view advertising links 93 on the web page and initiate the reproduction or downloading of files 1 by activating links 93.

In one implementation intermediary site 2 makes a selection from referring sites 9 eligible for advertising the various files 1. For this purpose, in one implementation candidate sites to be referring sites 9 communicate on-line 101 with intermediary site 2 and complete an online registration process consisting of identifying themselves (name, address, telephone, e-mail, etc.) and providing the URL so it can be located on the Internet. In one implementation during the registration process for referring site 9, intermediary site 2 can request that a series of words or descriptions be introduced that serve to describe content 91 of referring site 9.

In one implementation, when referring site 9 completes the registration process with intermediary site 2, intermediary site 2 provides the referring site 9 a code for an application for managing advertising insertions and links 92 that referring site 9 adds to its own web page, for example, by copying (Control+C in the Microsoft® Windows environment) the text of the code from the web page of intermediary site 2 and inserting it (Control+V in the Microsoft® Windows environment) into the HTML content of a web page of referring site 9. The advertising insertion management application and links 92 can be, for example, a Javascript language, PHP or ASP.NET code that communicates with intermediary site 2 by means of web services (collection of protocols and standards that serve to interchange data between websites through the Internet). In one implementation the advertising insertion management application and links 92 similarly enable intermediary site 2 to modify links 93 for the purpose of updating them. As will be seen below, this makes it possible to optimize the efficiency of referring sites 9 in terms of the number of file downloads and the number of sales.

In one implementation, when the said advertising insertion management application and links 92 are executed in a web page of referring site 9, it displays the advertising links 93. In one implementation, when a visitor to the web page of referring site 9 activates one of the links 93, data from intermediary site 2 is downloaded to the visitor's computer 5. For description purposes this data is called a "Description File," indicated by means of elements 25 and 19 in FIG. 1, and which is used by a multimedia player 52, using a streaming protocol, for example the RTSP, to request the multimedia content of file 24 from intermediary site 2 to computer 5, so that the content of file 24 can be played by multimedia player 52 at the same time as it is downloaded. In accordance with such an implementation it is not necessary to download the whole file 1 to view its content in multimedia player 52.

As explained below, in one implementation multimedia file 24 is a file consisting of the content of multimedia file 1, to which some advertisements have been added.

In one implementation once the referring site 9 has been registered, intermediary site 2 performs an analysis with the referring site 9 to verify that the advertising insertion management application and links 92 function correctly, and also to analyze content 91 from referring site 9. In one implementation intermediary site 2 counts the number of times that each word appears in content 91 of referring site 9, selects those words that represent a figure greater than a certain percentage, and stores this content information from referring site 9 in its database 21. In one implementation intermediary site 2 next picks the most suitable files 1 in relation to content 91 of referring site 9. For example, a referring site related to a black-and-white film will be particularly suitable for downloading black-and-white films, while a referring site related to rock music will be appropriate for providing rock music downloads. In one implementation, in order to pick which files 1 are the most appropriate for each referring site 9, intermediary site 2 compares the content information of referring site 9 which it has stored in its database 21 with commercial information 11 about files 1 provided by content owner site 3, and selects, for each referring site 9, the files 1 with a greater degree of coincidence with the content information of referring site 9.

In one implementation to optimize the number of file downloads 1 and the possible advertising income, intermediary site 2 continuously vary links 93 of each referring site 9 and statistically track which are the ones that generate the most downloads and the greatest advertising income. In one implementation intermediary site 2 monitors file downloads 1 at each referring site 9 and the advertising income generated by each file. In one implementation this statistical information is stored in database 21 of intermediary site 2. Accordingly, intermediary site 2 can determine which files 1 have the greatest probability of being downloaded and played, relating the historic advertising income with the keywords selected from each referring site 9. For example, by multiplying the advertising income generated when the advertisements associated with the audiovisual content of files 1 are displayed, by the percentage commission that referring site 9 will charge, intermediary site 2 obtains a statistical estimate of the earnings that each click on link 93 or each display of an advertisement of a file 1 implies for referring site 9. As a result, intermediary site 2 can update links 93 associated with a referring site 9, so that they advertise and point to the files 1 that will generate the greatest income. Another method that can be used by intermediary site 2 to select the most appropriate files 1 for each referring site 9 involves selecting files similar to those that have had the most success on another referring site 9 that has a similar content 91. Manual selection of the most appropriate files 1, which is understood to be a selection made by an individual, is always possible, but at a high cost. This cost can be reduced by using a computer program that automatically runs the described selection algorithms.

When a user uses a browser or web browser 50 of computer 5 to access a web page of referring site 9 containing the advertising insertion management program and links 92, and activates one of the links 93, the download process from intermediary site 2 of file 25 associated with said link 93 commences. In one implementation, to facilitate this, link 93 contains a URI address that points to file 25.

As explained above, in one implementation file 25 is a Description File, such as, for example an RTSP Description File, that includes information that allows the multimedia content of file 24 to be downloaded by means of a streaming protocol.

Computer 5 can use different protocols to download file 25 from intermediary site 2, such as for example, the HTTP, the RTSP, etc.

If computer 5 uses the HTTP protocol for downloading file 25, link 93 can be an HTTP type URI, and browser 50 downloads file 25 from a web server 23, for example by means of an HTTP protocol "GET" type message using the communication 103 to receive file 25, to which intermediary site 2 has added some identifying data 19 from affiliated website 9 from which the download of file 25 originated.

If computer 5 uses the RTSP protocol to download file 25, link 93 can be an RTSP type URI, and multimedia player 52 can send a "DESCRIBE" type RTSP message to streaming server 22, which responds by sending the file 25 data in a "200 OK" type RTSP message, using communication 104. In this case, the intermediary site may also add to file 25, some identifying data 19 from affiliated website 9 from which the download process of file 25 originated.

It is important to note that although the example of FIG. 1 shows the use of use of two servers, a single server, such as a RTSP server, or greater than two servers may be used to implement the present invention. Moreover, it is important to note that in multi-server implementations that it is not necessary that the servers reside in a single location but may be situated remotely from one another and connected in the network.

FIG. 1 shows multimedia player 52 separate from browser 50; however, other configurations are possible. For example, multimedia player 52 can be an application displayed within the window of browser 50 in computer 5.

In one implementation multimedia player 52 communicates with a streaming server 22 that uses the RTSP and RTP protocols.

In one implementation streaming server 22 has an RTSP module 221 and an RTP module 222 that runs on an application 220 that performs the streaming server functions. Modules RTSP 221 and RTP 222 are respectively responsible for the RTSP and RTP communications with the multimedia player. In one implementation both modules operate in a coordinated manner on the streaming server and communicate with one another.

In one implementation streaming server 22 also accesses the database or storage media 21 where it stores multimedia files, for example files containing audio and/or video. In one implementation streaming server combines various multimedia files to generate new multimedia files. For example, it can combine advertising files with content files to generate a multimedia file containing advertising and content.

In one implementation the communication in FIG. 1 represented by line 104 is used for communications employing the RTSP and RTP protocols between the multimedia player and streaming server 22 for exchanging messages and data. The communications represented by line 104 can utilize a data network, such as the Internet, for example. In one implementation communication 104 enables the streaming server 22 to send RTP packets to the multimedia player 52, and also enables the streaming server 22 and the multimedia player 52 to exchange control packets using a protocol called RTCP that forms part of the RTP protocol.

FIG. 2 shows an example of an exchange of "DESCRIBE" and "200 OK" type RTSP messages between multimedia player 52 and streaming server 22, in order to receive data from a Description File indicated by means of elements 25 and 19.

Identifying data 19 can be included in file 25 in several ways. For example, if the web address of affiliated website 9 is HTTP://www.website5000.com, one method of identifying affiliated website 9 is to include the URI in the data of file 25. Another way of identifying the affiliated website is by using a unique identifier for each affiliated website, for example, a numeric identifier such as "5000," which is associated with the URI HTTP://www.website5000.com of affiliated website 9 in database 21.

In the example of FIG. 2 the messages sent by the client, that is to say by multimedia player 52, to streaming server 22 is indicated in text in the form "C→S:", and messages sent by the streaming server 22 to the client are indicated in the form "S→C:".

In FIG. 2, the first message 250 is a DESCRIBE type message, sent by client 52 to streaming server 22, which includes the following RTSP URI that points to file 25. rtsp://server.streamingserver.com/file25 RTSP/2.0

In one implementation, when the streaming server receives this message, it responds with a "200 OK" type message consisting of two parts or blocks, 260 and 270. In one implementation the first part 260 of the "200 OK" message uses RTSP headers. As there is a description of RTSP headers in the above-mentioned IETF specifications, operation of the "Content-Type", "Content-Base" and "Referrer" headers will only be explained here. The "Content-Type header: application/sdp" (sixth line of block 260) serves to indicate that the arriving data uses the SDP (Session Description Protocol) protocol. The "Content-Base" header indicates the base RTSP URI of the multimedia content which will be transmitted in the streaming session and can be used for resolving other relative URIs in the message. The "Referrer" header, not shown in FIG. 2, is a header enabling the client to indicate to the streaming server the URI address from which it obtained the RTSP URI of the "Description File", normally by means of the HTTP.

Part 270 of the "200 OK" message are fields that use the SDP protocol to describe the method that the multimedia player are to use to request the content of file 24 from the streaming server. These fields are explained in the above-mentioned RFC 4566 that describes the SDP protocol, however, for better clarification, the meaning of some SDP fields are explained here following:

"v=" is the "Version" field and indicates that version 0 of the SDP protocol is used.

"o=" is the "Origin" field and contains various data, including the IP address originating the session.

"s=" is the "Session Name" field and can contain text describing the streaming server.

"i=" is the "Session Information" field and can provide information concerning the session. In FIG. 2, the identifying data 19 "www.website5000.com" identifying affiliated website 9 has been included in this field. The results are indicated in FIG. 2 by means of element 271.

"u=" is the "URI" field and is an HTTP type URI that can point to a web page containing additional information on the session.

"e=" is the "Email Address" field and can contain the e-mail address of the person managing the session.

"c=" is the "Connection Data" field. Each session contains at least one "c=" field for each data stream or a unique field "c=" for the streaming session. This field indicates the IP address that the streaming server will use to send each data stream of the session.

"a=" is the "attribute" and is used to extend the SDP protocol, defining new attributes by means of the syntax "a=<attribute>:<value>".

"a=recvonly" is an attribute indicating that the multimedia player only receives multimedia data and does not transmit multimedia data.

"m=" is the "Media Description" field. Each line "m=" contains information about a data stream of the streaming session, such as the type of content (audio, video), the port that will be used, the type of protocol (e.g., RTP/AVP) and the format in which the multimedia data will be sent.

"a=control:*" is an attribute called "Control URI" described in Appendix C of the RFC 2326 specifications that describe the RTSP protocol. It is used to indicate a URI that facilitates management of various streams of a multimedia session in an aggregate manner to enable, for example, the playing of audio and video from a multimedia content in a coordinated manner, by sending a single PLAY message to the streaming server. When it has the asterisk value ("*") then the value of "Control URI" is the base URI indicated in the RTSP header called "Content-Base".

On the last SDP lines of FIG. 2, it can be seen how the "200 OK" answer message indicates that the presentation or streaming session is composed of two streams: a first audio stream that uses port 3456 and the coding protocol RTP/AVP 0, and a second video stream that uses port 2232 and the coding protocol RTP/AVP 31.

In FIG. 2 the "a=control:*" line indicates that the "Control URI" is the same as the URI of the "Content-Base" header, that is to say the following value:
rstp://server.streamingserver.com/file24/

This Control URI is used for controlling the complete streaming session, that is to say, the audio and the video at the same time.

The RTSP URI that corresponding to the audio and video streams of FIG. 2 has the following values:
rtsp://server.streamingserver.com/file24/trackID=1 is the URI corresponding to the audio stream.
rtsp://server.streamingserver.com/file24/trackID=2 is the URI corresponding to the video stream.

In FIG. 2, the "a=control:*" line could include the value of the Control URI instead of the asterisk. For example, it could include the Control URI in the following form:
a=control: rstp://server.streamingserver.com/file24/

This may be necessary, for example, if the information about Description File 25 is transmitted to computer 5 using a protocol other than RTSP, for example, using the HTTP protocol or e-mail.

Figure 3:
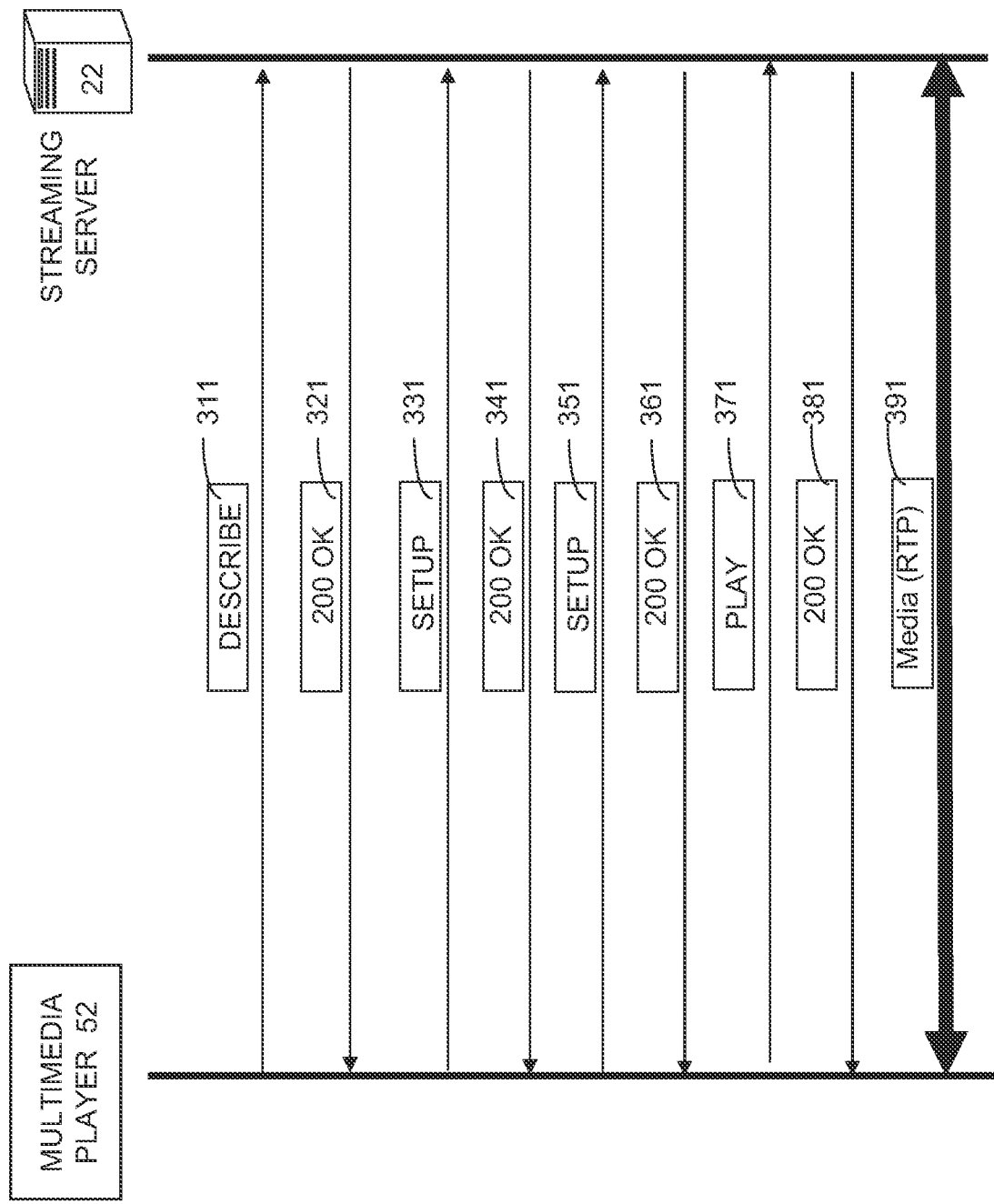
FIG. 3 shows an example of an exchange of messages between a multimedia player and a streaming server for playing multimedia content comprising two streams.

FIG. 3 shows an example of the interchange of RTSP messages between multimedia player 52 and streaming server 22 to initiate a streaming session that also contains two streams. Initially the multimedia player 52 sends a DESCRIBE 311 message to obtain the data 25 and 19 that the streaming server 22 sends in the "200 OK" 321 answer message. Once the multimedia player 52 has the data in the SDP protocol, it can initiate a streaming session by sending a SETUP type RTSP message to the streaming server 22 for each stream that it wants to receive, for example an audio stream and a video stream as in the example of FIG. 2. Next the multimedia player sends a first SETUP 331 message to prepare the multimedia transmission including an RTSP type URI corresponding to the audio stream.

In one implementation the first SETUP message does not include a "session" header identifying the streaming session and the streaming server 22; upon receiving the first SETUP message, creates a new streaming session and assigns a session identifier. In one implementation, the streaming server 22 next responds by sending a "200 OK" 341 answer message to the multimedia player 52, which includes all the information necessary for the multimedia player to be able to send RTSP messages by means of the recently created streaming session. The message includes the streaming session identifier created in the RTSP header called a "Session."

The multimedia player sends a second SETUP 351 message, using the streaming session identifier received in message 341, and an RTSP type URI corresponding to the video stream.

In one implementation when the streaming server 22 receives a SETUP message that includes a "session" header identifying a previously created streaming session, it adds the multimedia content identified in the RTSP URI of the SETUP message to the previously created streaming session. In this case it adds the video to the previously created streaming session to transmit the audio and is therefore able to transmit the audio and the video in an aggregated manner. In one implementation, the streaming server 22 next responds with another "200 OK" message 361, indicating that it is prepared to transmit the content. When the multimedia player 52 sends the PLAY message 371 using the same streaming session identifier, the streaming server 22 responds with another "200 OK" message 381 and begins to transmit the multimedia content, audio and video, to the streaming player, sending RTP packets 391 to the multimedia player.

In the example of FIG. 2, identifying data 19 that identifies the affiliated website 9 has been included in the Description File (e.g., data 25 and 19) in the "i=" field of the SDP protocol indicated in element 271. However, other SDP protocol fields can be used to transmit the information, such as for example the "s=" or "e=" fields. The "200 OK" message RTSP headers can also be used to send identifying data 19.

In one implementation identifying data 19 from the referring site is incorporated into the files 25 at the time of the download. To do so, when the user activates one of the links 93 at referring site 9, the link 93 includes the URL address for redirection to web server 23, and also includes the URL address of referring site 9 so that it can be transmitted to web server 23. This can be done, for example, by passing information about the URL address of referring site 9 as a parameter in the URL address that leads to the web page of the web server 23 from the web page of the referring site 9. In one implementation a download management application 40 that receives identifying data 19 from referring site 9 and incorporates it into file 25 to be downloaded by the user is run on web server 23. A practical example of this procedure is shown below.

A user access referring site 9 number 5000 and activates link 93 for downloading file 25. Link 93, which has been prepared by intermediary site 2 and installed in referring site 9 by the advertising insertion and links management program 92, contains the following URL address: http://www.webserver.com/website5000/25

The first part, "www.webserver.com", identifies the URL address of the web server 23, the second part, "website5000", is a parameter identifying the URL address of affiliated website 9, and the last part, "25", identifies the "Description File" 25 to be downloaded.

When web server 23 receives the request to download file 25, download management program 40, running on web server 23, examines this URL address, discovers that it comes from referring site 9 number 5000 and adds identifying data 19 from referring website 9 to the file 25 using, for example, field "i" of the SDP protocol.
i=Affiliate web site=www.website5000.com Once computer 5 has downloaded file 25 that includes identifying data 19, file 25 can be used on computer 5 by an application which is a multimedia player 52 for establishing communication 104 with streaming server 22.

When multimedia player 52 establishes the streaming session with server 22, it sends a series of messages using the RTSP, for example, those that were explained in FIG. 3.

In some of these RTSP messages, such as for example, the SETUP type messages, multimedia player 52 includes identifying data 19 that identifies affiliated website 9, and as a result streaming server 22 can associate the streaming session that it creates with affiliated website 9 that originated it.

In order to send identifying data 19 to the streaming server in the RTSP messages of communication 104, the multimedia player 52 can include the information in different RTSP headers, such as for example the "From", "Referrer", and "User Agent" headers. In one implementation when the streaming server receives a SETUP message for preparing a streaming session, the SETUP message includes identifying data 19 in an RTSP header, and as a result the streaming server can associate the streaming session created with affiliated website 9 that originated the streaming session by means of link 93. In this way, the streaming server can track the streaming session created and compensate affiliated website 9 for the advertisements that the streaming server transmits to the client during the session.

Figure 4:
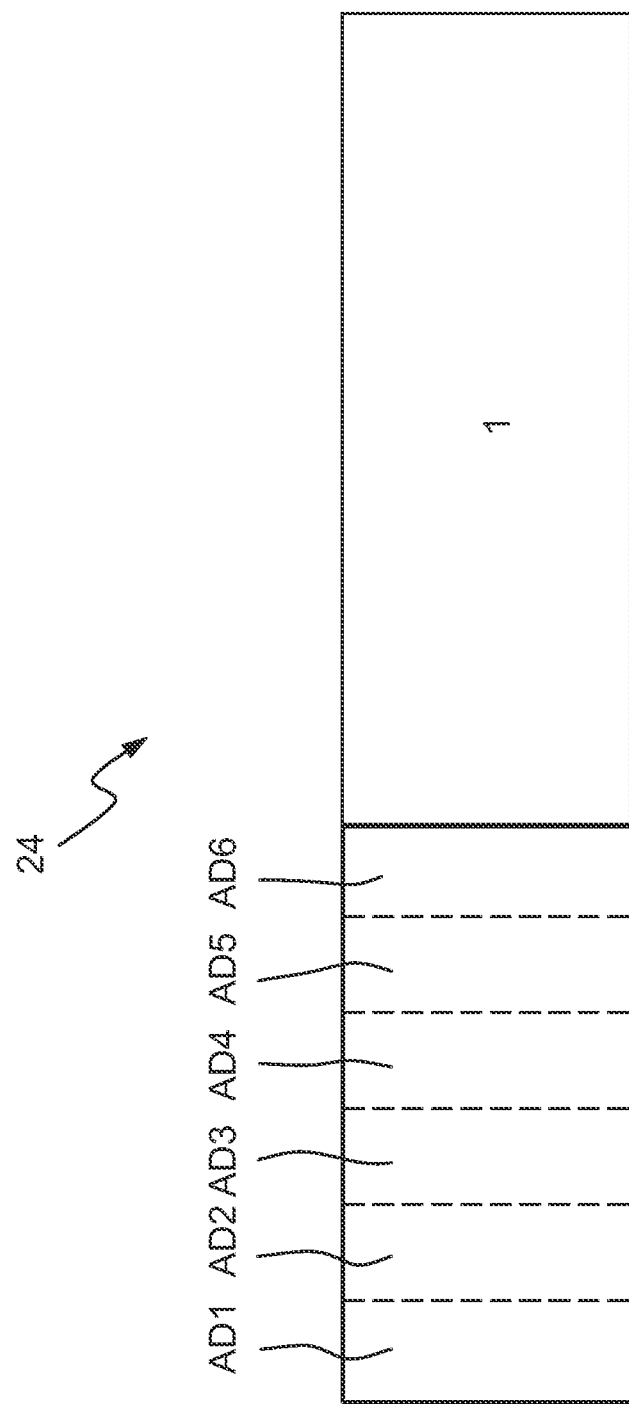
FIG. 4 shows a structure of a multimedia file comprising advertisements and content.

FIG. 4 shows the content of file 24 in one implementation. In the example of FIG. 4 the intermediary site 2 has inserted some advertisements AD1, AD2, AD3, AD4, AD5, AD6 before the content of file 1. As a result, the computer user may be required to play advertisements AD1 to AD6 before playing the content of file 1. In one implementation, streaming server 22 checks which part of advertisements AD1 to AD6 are transmitted to multimedia player 52 and maintains information useable for remunerating affiliated website 9 in accordance with the advertisements transmitted.

In one implementation streaming server 22 does not allow the multimedia player to play the content of file 1, unless advertisements AD1 to AD6 are played first. To do this, the streaming server 22 may disregard the PLAY messages that enable the advertisements to be skipped or to be run at a greater than normal play speed.

In one implementation intermediary site 2 makes a selection of the most suitable advertisements for each audiovisual content. To do so, in one implementation intermediary site 2 has an online advertisement auctions management module 28, where the various advertising sites 8 can offer different prices for their advertisements for certain categories of audiovisual content, for example, black-and-white films, or for specific audiovisual content, for example the film "Casablanca."

The advertisements that have been selected by intermediary site 2 can be inserted into file 24 by intermediary site 2 itself before the files are transmitted to computer 5 by means of streaming.

The identifying data 19 enables intermediary site 2 to remunerate or otherwise maintain data for remunerating the referring sites 9 for their participation in the downloading of file 25 that leads to the transmission and/or playing of the audiovisual content of file 24 that includes one or more advertisements.

An advantage is that referring sites 9 only will be remunerated for downloads that have actually led to the transmission and/or playing of the audiovisual content of files 24 that include one or more advertisements.

In one implementation the intermediary site 2 remunerates referring sites 9 only on the first occasion that the downloaded audiovisual content of files 1 is played in a player 52. In another implementation remuneration is made according to the number of times that the audiovisual content is played in player 52.

A system of sending identifying data 19 between client 52 and server 22 using an SDP field and/or an RTSP header has the disadvantage that it is not currently a standardized system and that it is necessary to modify the operation of multimedia players 52 to adapt them to some of the processes previously disclosed herein. For example, the multimedia player can be prepared to receive identifying data 19 in the SDP field "i=" of message "200 OK in answer to the DESCRIBE message and to transmit it in a specific RTSP header of the SETUP message.

Some of the implementations previously disclosed herein may require modifying the multimedia players currently on the market. In order to avoid this problem other implementations use a RTSP URI that points to multimedia file 24 or a "Container File," containing the advertisements and the content of file 1, to include identifying data 19 of the affiliated website in that URI. In one implementation intermediary site 2 creates a Description file 25 where the "Content-Base" RTSP header includes the RTSP URI incorporating identifying data 19.
Content-Base: rtsp:server.streamingserver.com/website5000/file24

In one implementation intermediary site 2 then creates link 93, which points to the Description File 25. The RTSP, which points to file 24, is sent by the streaming server 22 to client 52 in the "Content-Base" header of the DESCRIBE message, and is used in the SETUP messages that client 52 sends to server 22. Therefore, by including identifying data 19 in the RTSP URI pointing to multimedia file 24, the present invention may be implemented by standard multimedia player using the RTSP, or the like.

In one implementation, in order to include identifying data 19 in the RTSP URI pointing to file 24, the intermediary site creates a different RTSP URI for file 24 for each affiliated website 9 that originated the session. For example, supposing that affiliated website 9 has the address http://www.website5000.com and the streaming server 22 has assigned the URI rtsp:server.streamingserver.com. Intermediary site 2 creates a multimedia file 24 containing the content of file 1, for example a film, and adds some advertisements to the beginning of the multimedia file. In one implementation intermediary site 2 next assigns to file 24 the following RTSP URI that includes identifying data 19 "website5000" as part of the URI:
rtsp:server.streamingserver.com/website5000/file24/

Figure 5:
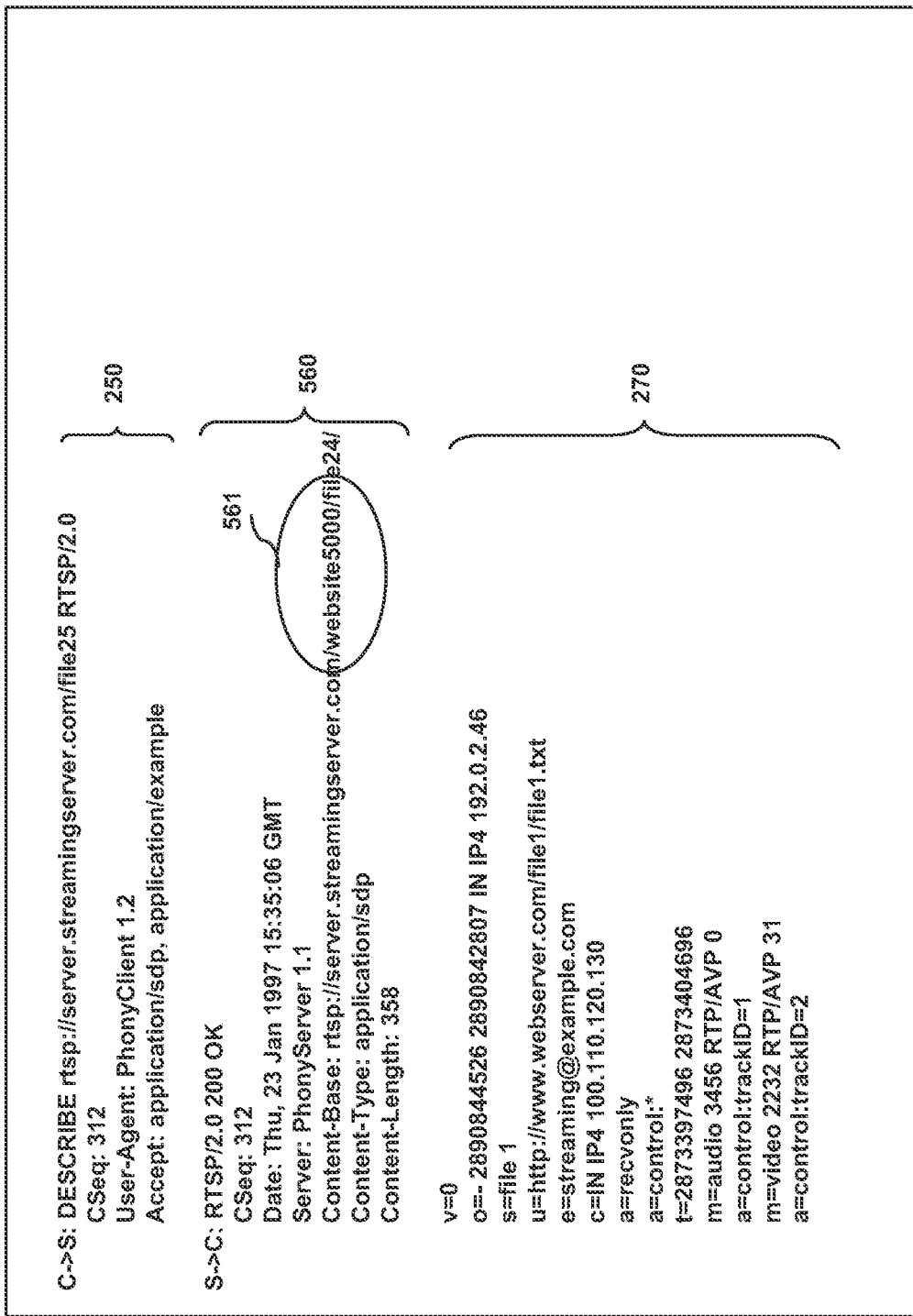
FIG. 5 shows an example of identifying data inserted into an RTSP URI and an RTSP message using an RTSP header.

FIG. 5 shows how identifying data 19 from the referring site, for example, the string "website5000", has been included in the URI associated with the "Content-Base" header of the "200 OK" message that the streaming server sends to the multimedia player. The identifying data is indicated in FIG. 5 by means of element 561. Accordingly, when computer 5 downloads file 25, for example, by means of the HTTP protocol or by means of the RTSP protocol, file 25 already includes identifying data 19 from the affiliated website in the RTSP URI of the "Content-Base" header. When computer 5 establishes the streaming session by means of one or several SETUP and PLAY type RTSP messages, the messages include the RTSP URI and this enables streaming server 22 to discover which affiliated website 9 containing link 93 generated the streaming session.

FIG. 6 shows another example in which identifying data 19 from the referring site, for example the string "website5000", has been included in the URI associated with the parameter "a=control:" from the data that the streaming server transmits using the SDP protocol:
a=control:rtsp://server.streamingserver.com/website5000/file24/

In FIG. 6, element 661 highlights identifying data 19 included between the SDP fields. The fields of FIG. 6 use the SDP protocol and are an example of "Description File" 25 that includes the data necessary for establishing a streaming session. The Description File data in FIG. 6 can be transmitted from the streaming server to the multimedia player using various protocols, such as for example, the HTTP, the RTSP, etc.

Figure 7:
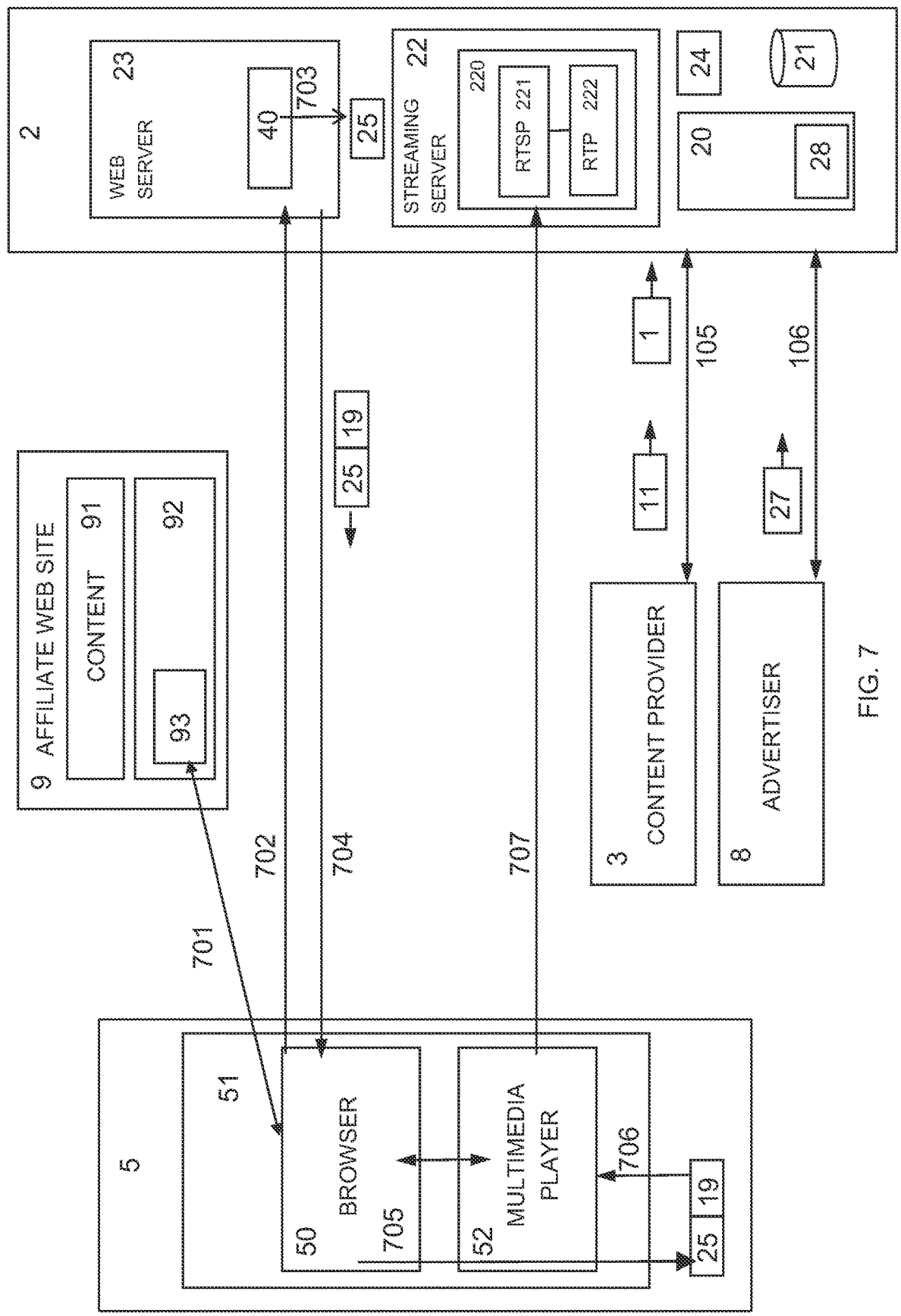
FIG. 7 shows a block diagram of an exemplary system for implementing the present invention.
Figure 8:
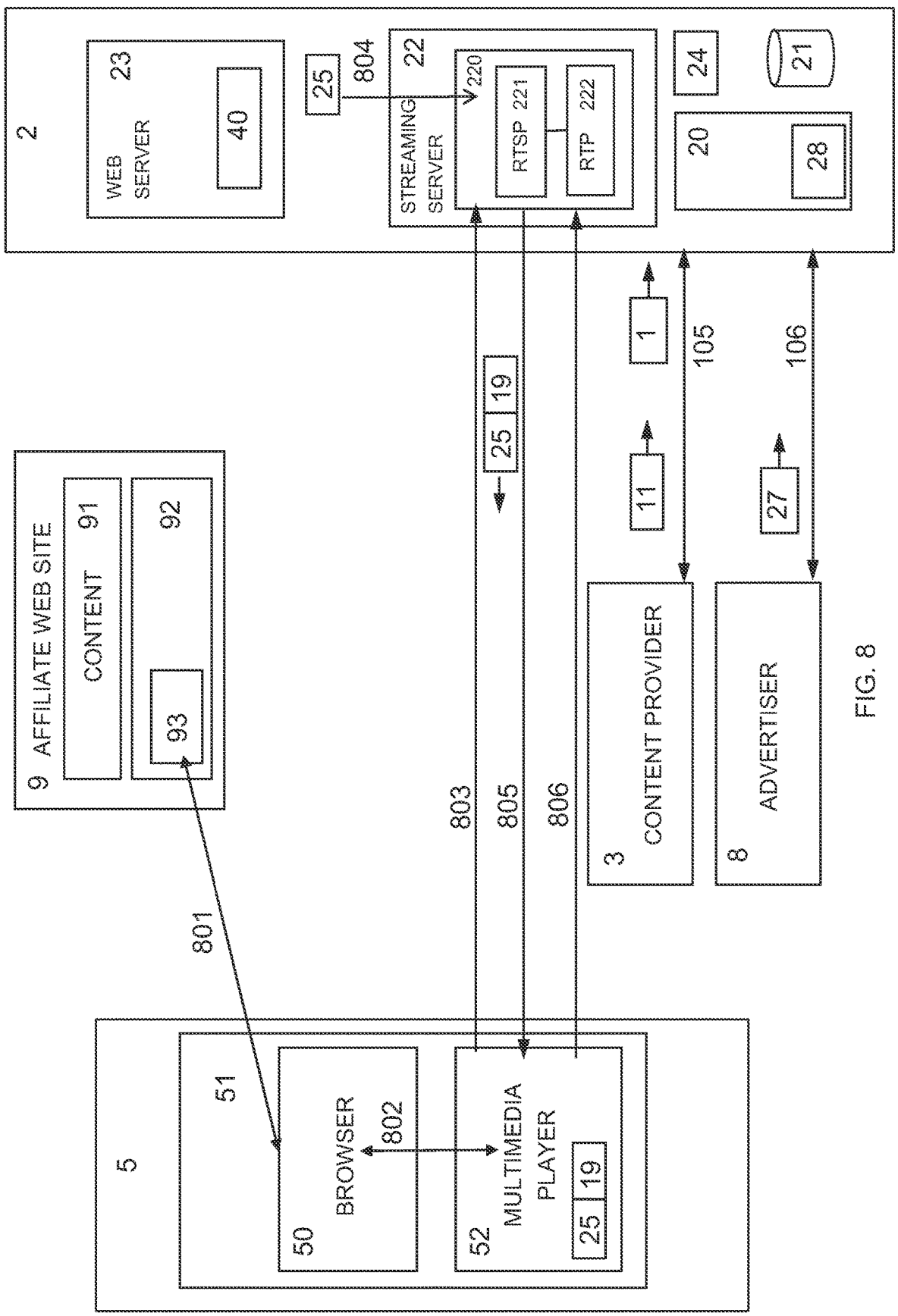
FIG. 8 shows a block diagram of an exemplary system for implementing the present invention.

FIGS. 7 and 8 show implementations that respectively use the HTTP and RTSP protocols to transmit the Description File 25 to computer 5.

In FIG. 7, in one implementation when browser 50 activates link 93, it obtains by means of communication 701, identifying data from affiliated website 9 and transmits it by means of communication 702 to web server 23. The identifying data from affiliated website 9 can be included, for example, in link 93 itself, which is an HTTP type URI that points to file 25.

In one implementation, in web server 23, an application 40 detects the identifying data from affiliated website 9 in the URI used to download file 25 and includes it by means of communication 703 in the "Description File" file 25.

As explained above, identifying data 19 from the referring site 9 can be added to the Description File 25 in several ways, using different RTSP headers or SDP fields. In one embodiment, identifying data 19 is included to the Description File 25 by means of a URI, for example an RTSP type URI that will be used by the streaming protocol of the multimedia player to access the content of multimedia file 24.

In one implementation the Description File 25, which includes identifying data 19 from referring website 9, is transmitted using communication 704 from web server 23 to browser 50 using the HTTP. In one implementation browser 50 next transmits the Description File (e.g., data 25 and 19) to multimedia player 52, for example storing it on the hard disk of computer 5, by means of communication 705 so that the multimedia player reads it, by means of communication 706.

As explained above, other forms of communication are possible between browser 50 and multimedia player 52. In one implementation the multimedia player 52 comprises part of browser 50.

In one implementation, once multimedia player 52 has data 25 and 19, it sends a SETUP message to the streaming server by means of communication 707 so that the streaming server creates a new presentation or streaming session that will be used to transmit the multimedia content of file 24. As a result of the SETUP message including identifying data 19 from referring website 9, the streaming server creates a new streaming session to transmit the content of file 24, it assigns a session identifier to the streaming session created, and stores the information about identifying data 19 associated with the identifier from the created streaming session in database 21. As a result, streaming server 22 can track the streaming session created in relation to referring website 9 where link 93 has been activated, and can check whether advertisements AD1 to AD6 are transmitted to multimedia player 52, in order to remunerate referring site 9 accordingly.

In the example of FIG. 7, arrows 701, 702, 703, 704, 705, 706 and 707 show the path that the identifying data from referring website 9 follow from the time that link 93 is activated until the streaming session is created in streaming server 22, and the identifier of the streaming session created is associated with identifying data 19 from referring site 9.

In the example of FIG. 8, the Description File is transmitted from streaming server 22 to multimedia player 52 using the RTSP. In the example of FIG. 8, link 93 is an RTSP type URI that points to the Description File 25. When browser 50 activates link 93, computer 5 receives the information from URI RTSP by means of communication 801. The URI RTSP of link 93 includes some identifying data of referring site 9. In one implementation browser 50 transmits the data about the URI RTSP of link 93, which points to the "Description File" file 25, to multimedia player 52 by means of communication 802. As explained previously, browser 50 can transmit information to multimedia player 52 in various ways.

In one implementation, to obtain the data from file 25, multimedia player 52 sends a DESCRIBE type RTSP message to streaming server 22 by means of communication 803, similar to that explained in FIGS. 2 and 5, which includes the RTSP URI of link 93 that points to the Description File 25. In one implementation, when streaming server 22 receives the DESCRIBE message, it locates and reads the "Description File" file 25 by means of communication 804, adds identifying data 19 from the referring site to the information of file 25 and responds to the multimedia player by means of a "200 OK" type RTSP message which includes the "Description File" file 25 data, and identifying data 19, and which transmits it using communication 805.

In one implementation once the multimedia player has the data 25 and 19, the operation is similar to that of FIG. 7. The multimedia player 52 sends a SETUP message to the streaming server by means of communication 806 and the SETUP message includes identifying data 19 so that the streaming server can associate the created streaming session with referring site 9 where link 93 has been activated, and can remunerate referring site 9 for the advertisements that are transmitted during the streaming session.

Arrows 801, 802, 803, 805 and 806 show the various communication paths used in conjunction with the processes disclosed in conjunction with the example of FIG. 8.

In one implementation, as illustrated by the two way communication paths of 102, 701 and 801 of the systems of FIGS. 1, 7 and 8, respectively, device 5 transmits information to the referring site 9 after having received an advertisement and/or upon having played a portion or all of an advertisement associated with a streaming session. The communication may be initiated by device 5 or prompted by a message sent from the referring site to the device 5. In this way, referring site 9 may obtain information pertaining to all advertisements, or a subset thereof, for the purpose of auditing or reconciling remuneration information obtained from the intermediary site 2. In one implementation the information transmitted to the referring site 9 comprises first identifying information associated with the advertisement and/or second identifying information associated with a site from which the computing device 5 receives the advertisement.

Although FIGS. 1, 7 and 8 show the use of an intermediary site 2 as a block, it is to be understood, as previously explained, that the present invention is in no way limited to the use of an intermediary site per se, nor is it limited by the number of servers that participate in carrying out the various processes described and contemplated herein.

What is claimed is:

1. An apparatus comprising:
   a user interface;
   a communication port; and
   a user computing device in communication with the user interface and the communication port, the user computing device configured to:
   receive, via the user interface, a selection to play digital multimedia content of a referring website on the user computing device;
   generate a first communication in a first internet protocol comprising a request to stream the digital multimedia content and identifying data for the referring website, wherein the first communication is configured to be sent via the communication port;
   receive a first data usable to establish a streaming session with a streaming server and the identifying data of the referring website;
   generate an initiation message based on the first data and the identifying data of the referring website in a second internet protocol to establish a streaming session to stream the requested digital multimedia content to the user computing device from the streaming server, wherein the initiation message is configured to be sent via the communication port; and
   streaming the requested digital multimedia content from the streaming server and at least one advertisement via the streaming session,
   wherein content of the initiation message is used to associate the referring website with the streaming session to remunerate the referring website based at least in part on the at least one advertisement streamed by the user computing device.

2. The apparatus of claim 1 wherein the first internet protocol is different from the second internet protocol.

3. The apparatus of claim 1 wherein the user computing device is further configured to play at least a portion of the at least one advertisement before the requested digital multimedia content is played at the user computing device.

4. The apparatus of claim 1 wherein to receive a selection to play digital multimedia content includes receiving input from a user activating a link on the referring website via the user interface.

5. An apparatus comprising:
a user interface;
a communication port; and
a user computing device in communication with the user interface and the communication port, the user computing device configured to:
generate a communication configured to be transmitted from the user computing device using a first internet protocol, the communication comprising identifying data of one of a plurality of referring websites and an initiation message based on data usable to establish a streaming session with a streaming server to receive selected content;
after the communication is transmitted, receive the selected content from the streaming server via a streaming session in a second internet protocol, the streaming session established by the streaming server based at least in part on the data of the communication transmitted by the user computing device; and
receive via the streaming session one or more advertisements configured to be played by the user computing device before the selected content is played by the user computing device;
wherein the identifying data transmitted by the user computing device is used to associate the streaming session with the one of the plurality of referring websites and to remunerate the one of the plurality of referring websites based on the one or more advertisements received by the user computing device via the streaming session.

6. The apparatus of claim 5 wherein the first internet protocol is different from the second internet protocol.

7. The apparatus of claim 5 wherein the user computing device is further configured to transmit information to the one of the plurality of referring websites after receiving an advertisement of the one or more advertisements from the streaming server.

8. The apparatus of claim 5 wherein to receive the selected content from the streaming server includes receiving a multimedia file with an indication of an advertisement and requested content to the user computing device.

9. The apparatus of claim 8 wherein to receive the first data usable to establish the streaming session and the identifying data of the one of the plurality of referring websites comprises receiving a description file with the identifying data of the one of the plurality of referring websites and the first data usable to establish the streaming session.

10. An apparatus comprising:
a user interface;
a communication port; and
a user computing device in communication with the user interface and the communication port, the user computing device configured to:
generate a first communication using a first internet protocol comprising a request for digital multimedia content and identifying data for one of a plurality of referring websites;
receive in response to the request: (i) first data usable to establish a streaming session with a streaming server; and (ii) the identifying data of the one of the plurality of referring websites associated with the request from the user computing device;
send a second communication comprising the identifying data and an initiation message based on the first data; and
streaming, upon sending the second communication, in a second internet protocol the requested digital multimedia content from the streaming server via the streaming session established in response to the initiation message, and intermittently streaming advertisements, wherein at least one of the advertisements is played by the user computing device before the requested digital multimedia content is played by the user computing device;
wherein the identifying data sent in the second communication is used to associate the streaming session with the one of the plurality of referring websites and to remunerate the one of the plurality of referring websites based on the advertisements played by the user computing device via the streaming session.

11. The apparatus of claim 10 wherein the first internet protocol is different from the second internet protocol.

* * * * *